(12) United States Patent
Park et al.

(10) Patent No.: US 10,197,288 B2
(45) Date of Patent: Feb. 5, 2019

(54) COMBINATION TYPE COOKER

(71) Applicant: LG ELECTRONICS INC., Seoul (KR)

(72) Inventors: Hyunwoo Park, Seoul (KR); Dongjae Lee, Seoul (KR); Seungyoun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 229 days.

(21) Appl. No.: 15/236,529

(22) Filed: Aug. 15, 2016

(65) Prior Publication Data
US 2017/0059168 A1 Mar. 2, 2017

(30) Foreign Application Priority Data
Aug. 25, 2015 (KR) .................. 10-2015-0119863

(51) Int. Cl.
| | | |
|---|---|---|
| H05B 6/02 | (2006.01) |
| H05B 6/12 | (2006.01) |
| F24C 1/04 | (2006.01) |
| A47J 36/36 | (2006.01) |
| A47J 36/38 | (2006.01) |
| F24C 3/00 | (2006.01) |
| F24C 15/30 | (2006.01) |

(Continued)

(52) U.S. Cl.
CPC ............... *F24C 1/04* (2013.01); *A47J 36/36* (2013.01); *A47J 36/38* (2013.01); *A47J 37/0682* (2013.01); *F24C 3/008* (2013.01); *F24C 3/047* (2013.01); *F24C 11/00* (2013.01); *F24C 15/101* (2013.01); *F24C 15/30* (2013.01); *F24C 15/322* (2013.01); *H05B 6/1209* (2013.01); *H05B 6/1263* (2013.01); *H05B 6/42* (2013.01)

(58) Field of Classification Search
CPC ........ A47J 36/36; A47J 36/38; A47J 37/0682; F24C 1/04; F24C 11/00; F24C 15/08; F24C 15/10; F24C 15/101; F24C 15/30; F24C 15/322; F24C 3/008; F24C 3/047; H05B 6/1209; H05B 6/1245; H05B 6/1254; H05B 6/1263; H05B 6/42
USPC ........ 219/600, 601, 620, 622, 672, 675, 676; 126/39 E, 39 R, 85 R, 79, 214 R
See application file for complete search history.

(56) References Cited

U.S. PATENT DOCUMENTS

2016/0057815 A1* 2/2016 Shaw ................... H05B 6/1245
219/622

FOREIGN PATENT DOCUMENTS

| CN | 2611770 | 4/2004 |
| CN | 2611770 Y * | 4/2004 |

(Continued)

OTHER PUBLICATIONS

International Search Report in International Application No. PCT/KR2016/009278, dated Nov. 25, 2016, 3 pages.

*Primary Examiner* — Hung D Nguyen
(74) *Attorney, Agent, or Firm* — Fish & Richardson P.C.

(57) ABSTRACT

A combination type cooker may include a top plate with a surface, a case that is configured to define a space shielded by the top plate, a gas burner that is provided inside the case, and in which a heat plate is heated by combustion of a fuel gas, an induction burner that is provided inside the case, and that is configured to heat a cooking container by induction, and a barrier that is provided between the gas burner and the induction burner, and that is configured to partition an inside of the case into a first space where the gas burner housed, and a second space where the induction burner is housed.

18 Claims, 11 Drawing Sheets

(51) Int. Cl.
  *F24C 15/32*  (2006.01)
  *H05B 6/42*  (2006.01)
  *A47J 37/06*  (2006.01)
  *F24C 3/04*  (2006.01)
  *F24C 11/00*  (2006.01)
  *F24C 15/10*  (2006.01)

(56) References Cited

FOREIGN PATENT DOCUMENTS

| | | |
|---|---|---|
| JP | 2001-263682 | 9/2001 |
| KR | 10-0651989 | 12/2006 |
| KR | 10-0829629 | 5/2008 |
| KR | 10-0829629 B1 * | 5/2008 |
| KR | 10-1465068 | 11/2014 |

* cited by examiner

COMBINATION TYPE COOKER

CROSS-REFERENCE TO RELATED APPLICATION(S)

The application claims priority under 35 U.S.C. § 119 and 35 U.S.C. § 365 to Korean Patent Application No. 10-2015-0119863 filed on Aug. 25, 2015 whose entire disclosure is hereby incorporated by reference.

BACKGROUND

Generally, a cooker is an apparatus which is used to heat and/or cook food using gas or electric power.

In an induction heating cooker is an apparatus, a high-frequency current flows through a working coil or a heating coil, and generates a strong line of magnetic force, an eddy current flows when the line of magnetic force passes through a cooking container, and the container itself is heated.

As a current is applied to the heating coil, a cooking container formed of a magnetic material generates heat by induction heating, and the cooking container itself is heated by the generated heat.

SUMMARY

According to one aspect, a combination type cooker may include a top plate with a surface, a case that is configured to define a space shielded by the top plate, a gas burner that is provided inside the case, and in which a heat plate is heated by combustion of a fuel gas, an induction burner that is provided inside the case, and that is configured to heat a cooking container by induction, and a barrier that is provided between the gas burner and the induction burner, and that is configured to partition an inside of the case into a first space where the gas burner housed, and a second space where the induction burner is housed.

Implementations according to this aspect may include one or more of the following features. For example, the cooker may include an insulator case that accommodates the gas burner and that is disposed at a first side of the barrier, and an induction case that accommodates the induction burner and that is disposed at a second side of the barrier. The barrier may include a partitioning portion that is configured to extend from a front end of the case to a rear end of the case, a plate supporting portion which is bent from one end of the partitioning portion, and that is configured to support a lower surface of the top plate, and a burner fixing portion which is bent from the other end of the partitioning portion, and that is configured to couple with the insulator case and the induction case, and that is configured to fix the gas burner and the induction burner.

The partitioning portion may be configured to be bent several times and is configured to pass the gas burner and the induction burner. The cooker may include coupling portions that are configured to connect the insulator case and the induction case with the burner fixing portion and that are provided at the insulator case and the induction case. The cooker may include one pair of plate brackets installed at each of a left side and a right side of a lower surface of the top plate, the pair of plate brackets being configured to fix each of the insulator case and the induction case. The plate bracket may include an extending portion that is configured to extend along the lower surface of the top plate, a top plate fixing portion that is located at an upper end of the extending portion, and that is configured to be fixed to the top plate, an operation unit fixing portion that is bent inward from a front end of the extending portion, and that is configured to fix both ends of an operation unit provided inside the case, and a bracket fixing portion that is located at the top plate fixing portion, that is configured to extend downward, and that is configured to fix outer ends of the insulator case and the induction case.

The operation unit may be in contact with the lower surface of the top plate, and is configured to respond to a user performing a touch operation. The cooker may include a main fan that is provided at a space between the operating unit, the gas burner, and the barrier, that is configured to suction air outside the case, and that is configured to cool a gas burner accommodating space partitioned by the barrier. The cooker may include an induction fan that is provided at a space where the induction burner is provided, that is configured to suction the air outside the case, and that is configured to cool an induction burner accommodating space partitioned by the barrier. The cooker may include a plurality of switching elements that are provided inside the induction case, the induction fan being located at one side of the induction case, and being configured to enable cooling air to pass through the induction case.

The induction case is provided between the induction fan and a grille vent located at a rear of the top plate. The cooker may include an electronic valve unit that is provided inside the case, that is configured to control gas supply to the gas burner, and that is controlled by an operation of the operation unit. The cooker may include a side barrier that is provided at the case, that is configured to connect a rear surface of the case with one side surface, and that is configured to partition an inside of the case, where the electronic valve unit is accommodated in an independent space partitioned by the barrier and separated from the gas burner. The cooker may include a sub-fan that is provided at a space where the electronic valve unit is accommodated, that is configured to suction air outside the case, and that is configured to cool the electronic valve unit. The barrier is configured to cross an exhaust portion through which air in the case is discharged. The cooker may include a plurality of burners accommodated in the insulator case. The case may be buried and installed at furniture in a built-in method. The combination type cooker may be configured to be disposed above an oven of a gas oven range. The case may be an outer case which is configured to define an exterior exposed to an outside when the combination type cooker is installed.

DETAILED DESCRIPTION

Figure 1:
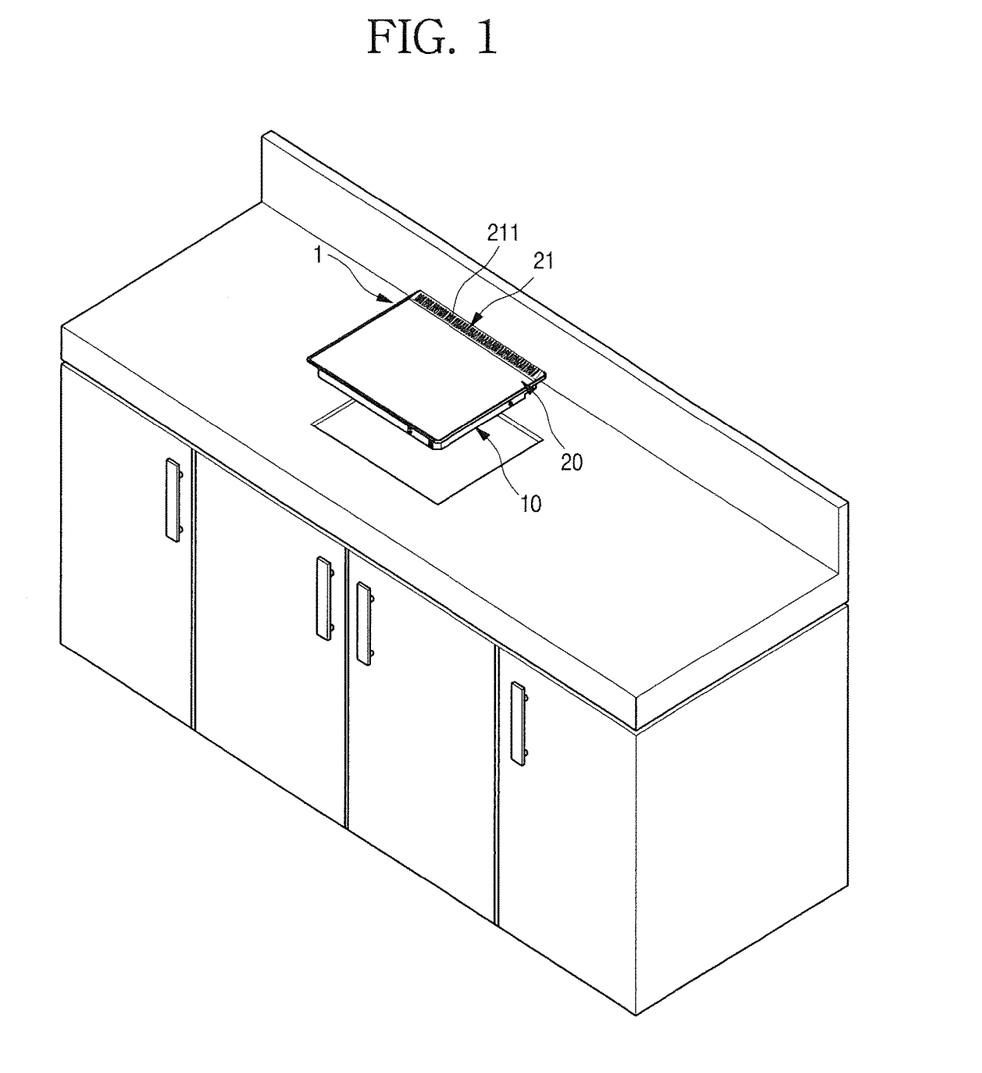
FIG. 1 is an exploded perspective view illustrating an installing state of an example of a combination type cooker.

As illustrated in FIG. 1, a gas cooker 1 may be installed at an upper surface of furniture such as a sink. The gas cooker 1 is formed to be seated in an opening formed at an upper surface of the sink, and an exterior of the gas cooker is exposed through the upper surface of the sink may be formed by a top plate 20.

The entire exterior of the gas cooker 1 may be configured with a case 10, the top plate 20 and a grille vent 21.

The case 10 may be formed of a plate-shaped steel material, and an upper surface of the case is bent to be opened, and a space in which a plurality of elements for operating the gas cooker 1 are accommodated is provided within the case. When the gas cooker 1 is installed at the sink, the case 10 is in an accommodated state inside the opening of the sink.

The top plate 20 forming an upper surface of the gas cooker 1 is provided at the opened upper surface of the case 10. The top plate 20 shields the opening of the sink while the gas cooker 1 is installed at the sink, is exposed through the upper surface, and forms the exterior of the upper surface of the gas cooker 1. The top plate 20 provides a flat surface on which food to be cooked is seated.

The grille vent 21 through which exhaust gas is discharged is provided at a rear end of the top plate 20. The grille vent 21 is formed to slightly protrude from the top plate 20, and a plurality of vent holes 211 are opened at the grille vent 21 so that the exhaust gas is discharged through the vent holes 211.

Figure 2:
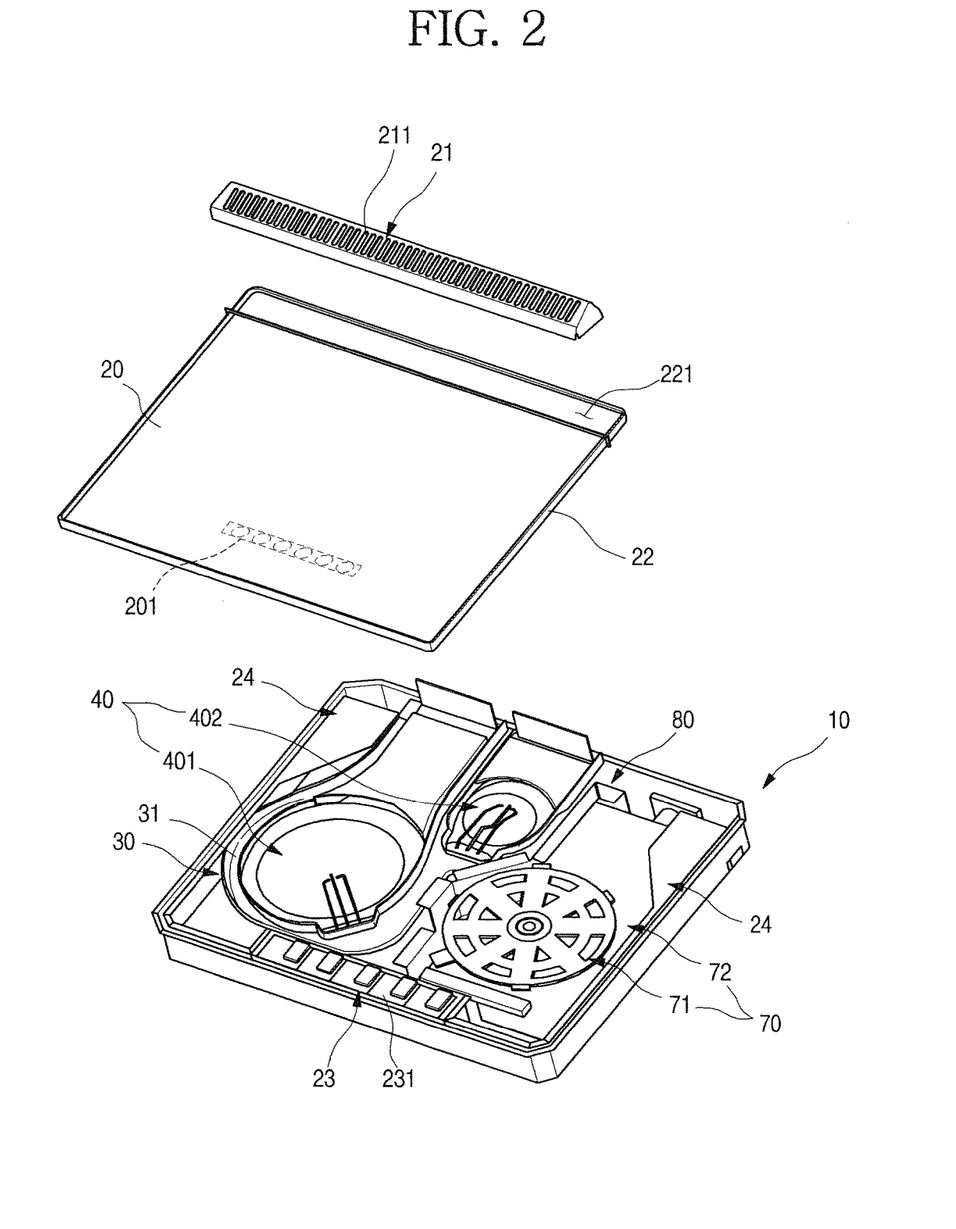
FIG. 2 is an exploded perspective view of the combination type cooker.
Figure 3:
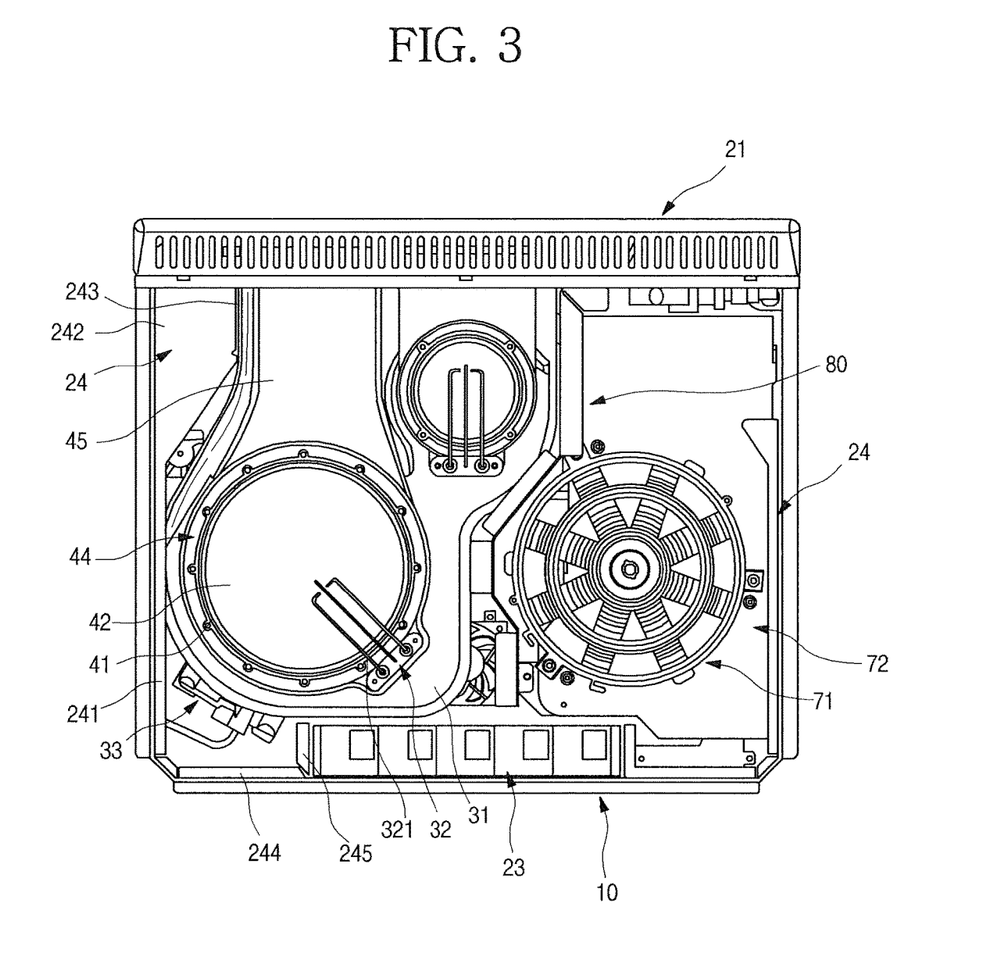
FIG. 3 is a plan view of the combination type cooker where a top plate is removed.
Figure 4:
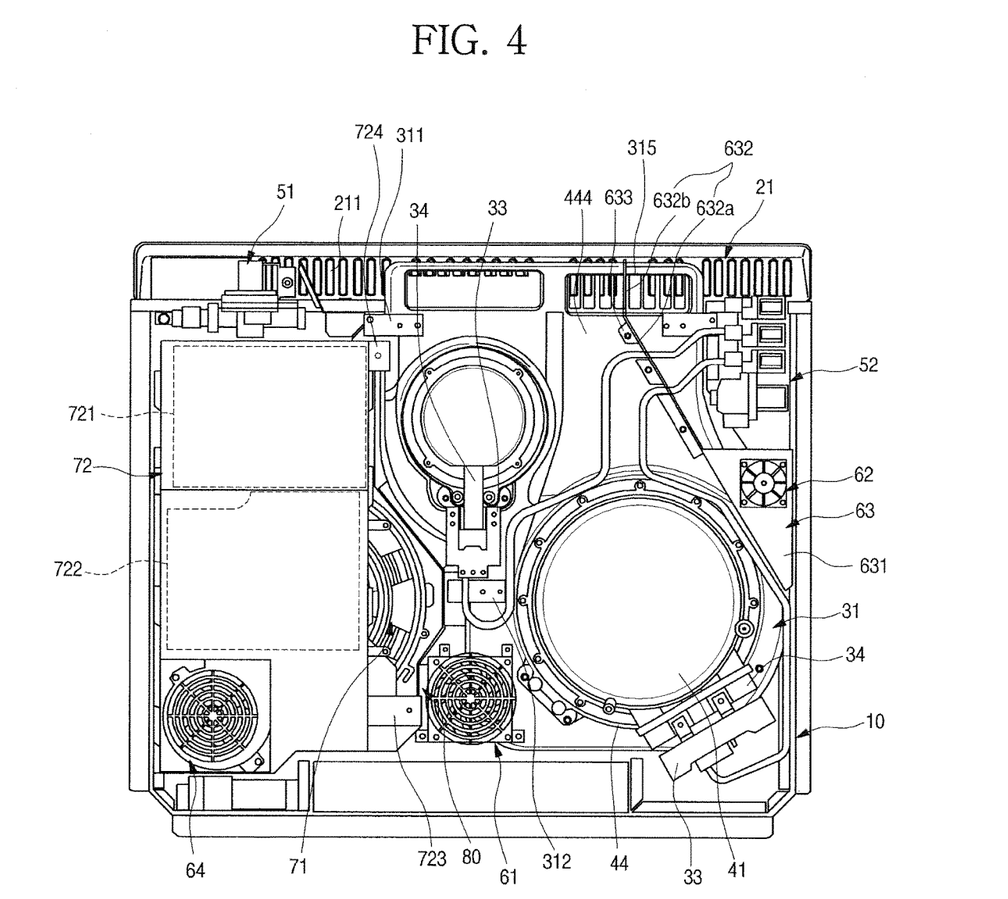
FIG. 4 is a rear view illustrating a state where a bottom surface of a case of the combination type cooker is removed.

As illustrated in FIGS. 2-4, the upper surface of the gas cooker 1 is formed by the top plate 20, and the other exterior except the upper surface is formed by the case 10.

The top plate 20 may be formed of a ceramic glass material, and a top frame 22 may be provided at a perimeter of the top plate 20, and may form an exterior of the perimeter of the top plate 20. A grille vent seating portion 221 which is opened so that the grille vent 21 is seated therein may be formed at the top frame 22, and a space in which a plate for seating the top plate 20 is seated may be provided at a front of the grille vent seating portion 221.

An operation unit 23 may be provided under the top plate 20. The operation unit 23 is operated to control heating power of the gas cooker 1 by a user, and may be formed to be operated by the user's touching operation. The operation unit 23 may be configured with an electronic switch or a sensor, or any other suitable a touching method.

An operation part 201 which enables the user to recognize an operating portion of the operation unit 23 may be formed at an upper surface of the top plate 20 corresponding to the operation unit 23. The operation part 201 may be formed at the upper surface of the top plate 20 in a printing method or a film attaching method, and may also be formed in a transparent or translucent type so that at least a part of the operation unit 23 is exposed. Also, the operation part 201 may be formed not to be recognized from an outside through the top plate 20 before an operation thereof, but to be recognized from the outside by turning on a separate backlight.

The operation unit 23 may be located at a front end of the top plate 20, and may be formed so that an upper end of the operation unit 23 is completely in close contact with the top plate 20. The operation unit 23 may also be formed to be coupled to the top plate 20 and to be disassembled from or assembled to the case 10 in a module state.

The opened upper surface of the case 10 may be formed to have a somewhat smaller area than that of the top plate 20, and may also be formed to have a structure in which the perimeter of the top plate 20 further protrudes to an outside of the case 10 when being coupled to the top plate 20. An exterior of the case 10 may be formed by bending the steel plate material, and if necessary, may be formed by injection-molding a resin material.

When the top plate 20 and the case 10 are coupled to each other, a space is formed inside the case 10, and a burner unit 30 may be provided in the space. The burner unit 30 may include a plurality of gas burners 40 in which combustion of a supplied mixed gas occurs, and an insulator case 31 at which the gas burners 40 are fixed and installed.

Each of the gas burner 40 has a nozzle 33 for supplying the gas, and a mixing tube 34 through which a fuel gas and air are mixed and introduced to a burner port 41 of the gas burner 40 may be provided at an outlet side of the nozzle 33. The nozzle 33 and the mixing tube 34 may be formed in one module, and may be respectively fixed to and installed at the burner port 41 of the gas burner 40.

The plurality of gas burners 40 may be provided, and may include a first burner 401 and a second burner 402. Both of the first burner 401 and the second burner 402 may be seated on the insulator case 31 formed in a single unit, and may have a structure which is installed inside the case 10 together with the insulator case 31. The number of the gas burners 40 and a size of each of the gas burners 40, which are installed at the insulator case 31, are not limited to the proposed embodiment, and may be variously applied.

A gas pipe 35 is provided inside the case 10. The gas pipe 35 connects a regulator 51 and a valve unit 52 with the gas burners 40 so that the gas is supplied to each of the gas burners 40.

The gas burner 40 may include the burner port 41 to which the mixed gas is supplied, a red-heat plate 42 which is seated at the burner port 41 to be heated by the combustion of the mixed gas, and a burner holder 44 and a burner cover 45 which supports the burner port 41 and the red-heat plate 42.

Specifically, the burner port 41 is formed in a cylindrical shape of which an upper surface is opened, and the red-heat plate 42 is seated on the upper surface. The mixing tube 34 which supplies the mixed gas is inserted and installed at one side of an outer portion of the burner port 41.

The mixing tube 34 may be formed so that a plurality of tubes are disposed at regular intervals to enable the gas supplied through the nozzle 33 to be evenly introduced into the burner port 41.

A plurality of nozzles 33 through which the mixed gas is injected has a structure which is fixed by a nozzle holder to be spaced apart from the mixing tube 34, and an outlet port of each of the nozzles 33 is located at a location corresponding to an inlet port of the mixing tube 34. Therefore, the inlet port of the mixing tube 34 is located at the location corresponding to the outlet port of the nozzle 33 to be spaced apart by a predetermined gap, such that air is mixed together by a pressure difference due to a flow of the gas when the gas is injected through the nozzle 33.

The red-heat plate 42 is seated on an upper surface of the burner port 41. The red-heat plate 42 is formed to completely shield the opened upper surface of the burner port 41. The red-heat plate 42 may be formed of a porous ceramic mat, and the mixed gas flowing on a surface of the red-heat plate 42 may be burned. The red-heat plate 42 may be formed of another material which is usable to the gas burner 40.

A spark plug 32 is fixed to and installed at one side of the burner holder 44. The spark plug 32 serves to ignite the mixed gas in the gas burner 40, is provided above the red-heat plate 42, and extends from an outside of the red-heat plate 42 toward an inside thereof to ignite the mixed gas.

Also, a flame detecting means 321 may be provided at one side of the spark plug 32. The flame detecting means 321 serves to check an ignition state of the gas burner 40 through a change in a voltage or a temperature of the red-heat plate 42, and may be formed in a module integrally formed with the spark plug 32, and may extend along with the spark plug 32 from an upper side of the red-heat plate 42 toward the inside of the red-heat plate 42.

A burned gas guide portion 444 formed to extend backward is formed at the burner holder 44. The burned gas guide portion 444 may extend to a rear end of the case 10 corresponding to a location of the grille vent 21. Therefore, the burned gas generated when the combustion occurs at the gas burner 40 may be guided to the grille vent 21 along the burner holder 44, and then may be discharged to an outside.

The burner cover 45 is provided above the burned gas guide portion 444. The burner cover 45 forms a flow path of the burned gas flowing through the burned gas guide portion 444, and shields an opened upper side of the burned gas guide portion 444. A rear end of the burner cover 45 is formed to be spaced apart from a rear end of the burned gas guide portion 444, such that cooling air in the case 10 and the burned gas passing through the burned gas guide portion 444 are mixed and then discharged.

An insulator for preventing heat of the burner unit 30 from being transferred to the outside of the case 10 or some areas of the top plate 20 may be provided between the burner holder 44 and the top plate 20 and between the burner holder 44 and the insulator case 31.

A main fan 61 and a sub-fan 62 may be provided inside the case 10. Each of the main fan 61 and the sub-fan 62 is formed to have a box fan, and also formed to suction air outside the case 10 and then to discharge the suctioned air from an inside of the case 10. A structure of the fan may be employed according to a user's selection.

The main fan 61 and the sub-fan 62 enable external air to be introduced to the inside of the case 10 having a sealed structure, and simultaneously enable the air inside the case 10 to forcibly flow and thus to cool the inside of the case 10. The air forcibly flowing in the case 10 may be discharged to an outside through the grille vent 21.

The main fan 61 may be provided at a space among the first burner 401, the second burner 402, a barrier 80 and the operation unit 23. That is, the main fan 61 is located at a location close to the operation unit 23, the first burner 401 and the second burner 402, and may cool the operation unit 23, the first burner 401 and the second burner 402.

The air forcibly flows toward the operation unit 23 by driving of the main fan 61, and may cool a PCB 231 forming the operation unit 23. A lower surface of the top plate 20 at which the operation unit 23 is located, in particular, the operation part 201 may also be cooled by the main fan 61.

Therefore, through cooling of the PCB 231, the operation unit 23 and the operation part 201 of the top plate 20 may be cooled so that the user does not feel discomfort due to heat generated when operating the operation part 201 of the top plate 20.

By the driving of the main fan 61, the air outside the case 10 is introduced, and forcibly flows radially centering on the case 10, and some of the air may flow along perimeters of the first burner 401 and the second burner 402, and thus heat from the first burner 401 and the second burner 402 does not stay at the inside of the case 10, but is discharged to the outside.

Therefore, a space of the internal space of the case 10 at which the gas burner 40 is provided may be cooled by the driving of the main fan 61, and may also protect electronic components in the case 10, i.e., the PCB 231 and sensors forming the operation unit 23.

The sub-fan 62 serves to cool the valve unit 52 which is configured with an electronic valve such as a solenoid valve provided at one side in the case 10, and may be provided at one side of an edge of a rear half portion of the case 10. The sub-fan 62 is provided inside a space partitioned by a side barrier 63, and by the side barrier 63, a space in which the valve unit 52 is disposed may be partitioned from the space in which the gas burner 40 is provided.

Therefore, by driving of the sub-fan 62, the air outside the case 10 may be introduced into the space partitioned by the side barrier 63, and the valve unit 52 may be cooled separately from the space in which the gas burner 40 is disposed.

Specifically, the side barrier 63 may be fixed to and installed at a bottom surface of the insulator case 31, and may be installed so that both ends are in contact with one of both of left and right side surfaces of the case 10 and a rear surface of the case 10.

The side barrier 63 may generally include a fan seating portion 631 providing a surface on which the sub-fan 62 is seated, and an extending portion 632 which partitions the internal space of the case 10.

Specifically, the fan seating portion 631 is formed in an approximately triangular plate shape, and also formed to be in contact with an upper surface of a fan installing portion 11. The sub-fan 62 may be fixed to the fan seating portion 631, and the side barrier 63 installed at the insulator case 31 may be assembled inside the case 10 together with the insulator case 31.

The fan seating portion 631 is formed in a right-angled triangular shape, and also formed so that one inclined end of the fan seating portion 631 is connected to the extending portion 632, and the other end is in close contact with a side surface of the case 10. Therefore, the side barrier 63 may be maintained in a stably fixed state without vibration due to an air flow.

The extending portion 632 is formed to be vertically bent upward from the inclined end of the fan seating portion 631, and also formed to be fixed to a lower end of the insulator case 31 and to partition the internal space of the case 10.

The extending portion 632 extends along the inclined end of the fan seating portion 631, may further extend outward, and may include a first extending portion 632a which partitions the case 10, and a second extending portion 632b which is bent from an end of the first extending portion 632a and partitions a side exhaust port 315.

The first extending portion 632a is formed to partition a space between the insulator case 31 and the case 10, and to guide the flow of the air blown by the sub-fan 62.

The second extending portion 632b is bent from the end of the first extending portion 632a, passes through the side exhaust port 315, and extends to be in contact with the rear end of the case 10. Accordingly, by the second extending portion 632b, the side exhaust port 315 may be divided into both of left and right sides based on the second extending portion 632b, and the cooling air flowing along the first extending portion 632a may be independently discharged through the side exhaust port 315 partitioned by the second extending portion 632b.

A bent portion 633 which is bent outward may be further formed at an upper end of the first extending portion 632a. The bent portion 633 is in contact with a lower surface of the insulator case 31. A fastening member such as a screw and a bolt may be fastened to the bent portion 633 and the insulator case 31, and the side barrier 63 may be fixed and installed.

Each of the main fan 61 and the sub-fan 62 is installed to be in close contact with an opening formed at the bottom surface of the case 10. Since the case 10 has a structure in which a remaining portion of the case except a portion at which the main fan 61 and the sub-fan 62 are installed is sealed, the air introduced into the case 10 may be introduced only through the main fan 61 and sub-fan 62.

The internal space of the case 10 may be partitioned by the barrier 80. The barrier 80 extends from a front end of the case 10 to the rear end of the case, and partitions the internal space of the case 10 into both of left and right sides. The gas burner 40 is provided in one side space partitioned by the barrier 80, and an induction burner 70 is provided in the other side space.

The induction burner 70 is provided at one side of a space partitioned by the barrier 80. The induction burner 70 may include an induction heating part 71 which is installed at a lower side of the top plate 20 and provides an alternate magnetic field to a cooking container put on the top plate 20, and an induction case 72 which is disposed at a lower side of the induction heating part 71 to support the induction heating part 71 and in which elements for operating the induction heating part 71 are accommodated.

An inverter module 722 which supplies AC power to the induction heating part 71, and a switching element which is disposed as one of electronic elements of the inverter module 722 at one side of the inverter module 722 and generates high temperature heat may be provided inside the induction case 72. At this point, the switching element may be formed in a coupled state to a cooling means such as a heat sink. A control part 721 for controlling an operation of the induction burner 70 may be provided at one side of the induction case 72.

The induction case 72 is opened in forward and backward directions, and an induction fan 64 which cools an inside of the induction case 72 is provided at an opened front of the induction case 72. Therefore, the control part 721 and the inverter module 722 in the induction case 72 may be cooled by driving of the induction fan 64. In addition, the inside of the case 10 may be cooled by discharging the air in the internal space of the case 10, in which the induction burner 70 is provided, to the outside.

The insulator case 31 and the induction case 72 which are provided at both of left and right sides of the barrier 80 may be fixed to and installed at the barrier 80. To this end, coupling portions 723, 724, 311 and 312 for coupling with the barrier 80 may be further formed at the insulator case 31 and the induction case 72, respectively. The coupling portions 723, 724, 311 and 312 may be integrally formed with the insulator case 31 and the induction case 72, and may be formed by coupling a separate member.

A plate bracket 24, an extending portion 241 included in the plate bracket 24, a top plate fixing portion 242, a bracket fixing portion 243, an operation unit fixing portion 244 and a fixing portion 245 which are not described will be described below in detail.

Figure 5:
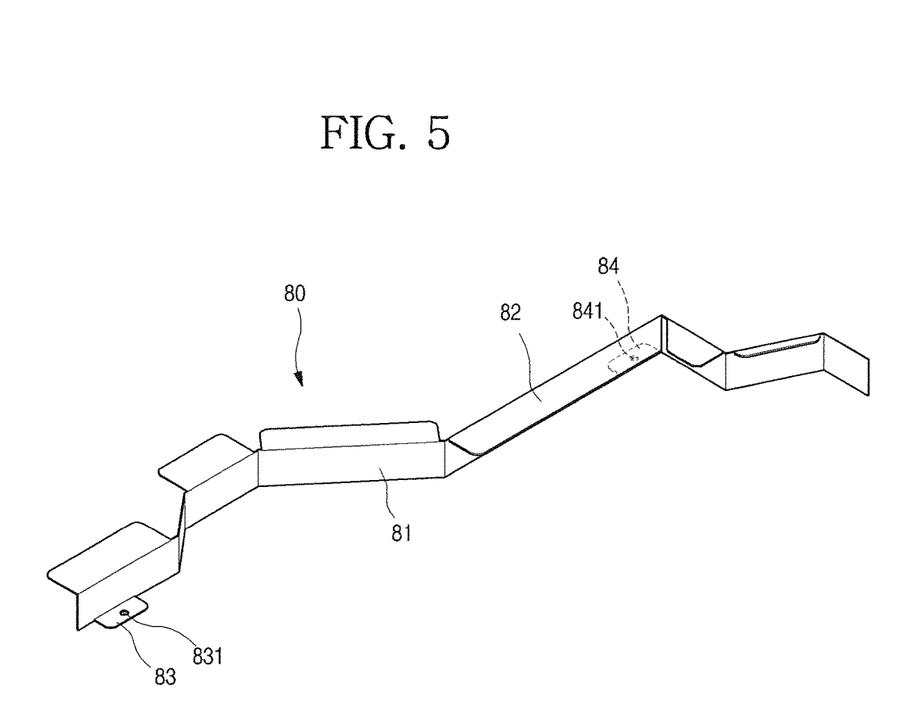
FIG. 5 is a perspective view of an example barrier of the combination type cooker.
Figure 6:
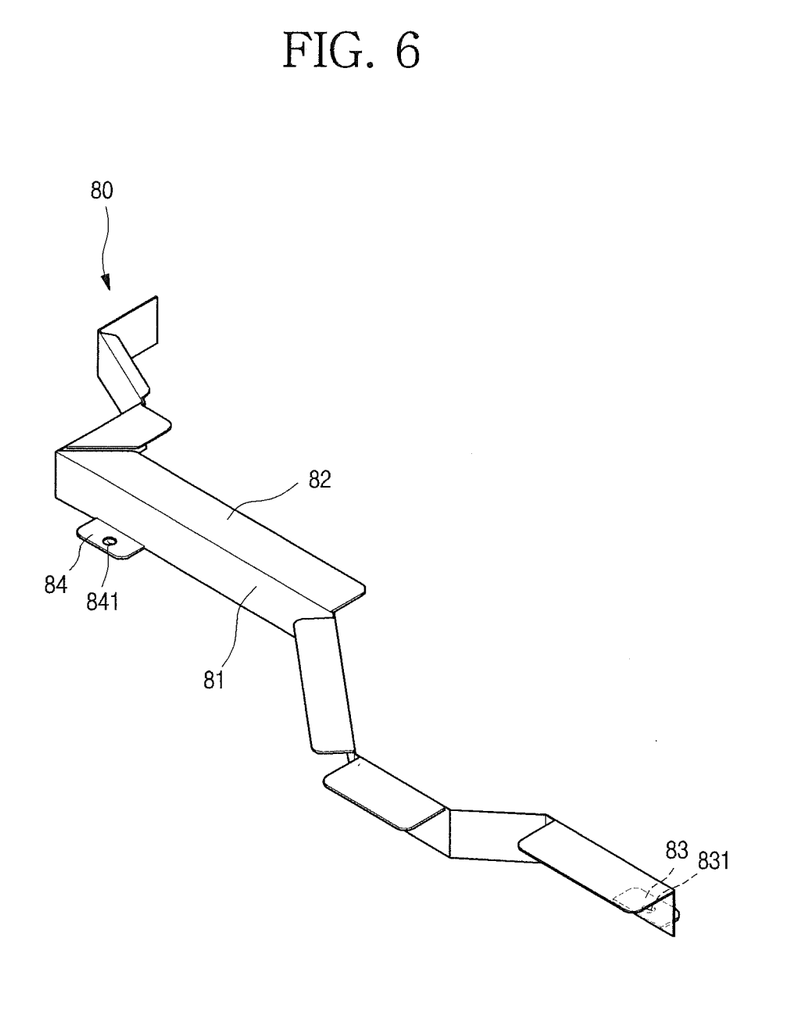
FIG. 6 is a perspective view of the barrier when being seen from another direction.

As illustrated in FIG. 5 and FIG. 6, the barrier 80 may include a partitioning portion 81 which extends from the front end of the case 10 to the rear end thereof, a plate supporting portion 82 which is bent from an upper end of the partitioning portion 81 and supports the lower surface of the top plate 20, and burner fixing portions 83 and 84 which are bent from a lower end of the partitioning portion 81, coupled to the insulator case 31 and the induction case 72 and fix the gas burner 40 and the induction burner 70.

The partitioning portion 81 may be formed to be bent several times and to allow a smooth air flow without interference with the gas burner 40 and the induction burner 70, and both of extending ends are in contact with a front surface and a rear surface of the case 10, respectively.

The plate supporting portion 82 is formed to have a predetermined area, and may be formed to be bent outward from the upper end of the partitioning portion 81. Therefore, the plate supporting portion 82 may be bonded or attached to the lower surface of the top plate 20, and thus may be fixed thereto. Accordingly, the barrier 80 may be fixed to and installed at the top plate 20.

The burner fixing portions 83 and 84 are formed to be bent outward from the lower end of the partitioning portion 81, and also formed to extend in a predetermined length. The screw holes 831 and 841 in which the fastening member is fastened may be formed at the burner fixing portions 83 and 84. Therefore, the coupling portions 311, 312, 723 and 724 formed at the insulator case 31 and the induction case 72 are formed to be fixed to the burner fixing portions 83 and 84 by the fastening member S, respectively. For example, the coupling portions 311, 312, 723 and 724 of the insulator case 31 and the induction case 72 may be fixed to the burner fixing portions 83 and 84 by the fastening member S such as the screw.

The numbers and locations of the coupling portions 311, 312, 723 and 724 and the burner fixing portions 83 and 84 are not limited to the described implementation, and if necessary, a plurality of burner fixing portions 83 and 84 may be formed at any locations of the barrier 80, and the coupling portions 311, 312, 723 and 724 may be formed at locations corresponding to the burner fixing portions 83 and 84, respectively.

The side surfaces of the insulator case 31 and the induction case 72 close to the barrier 80 may be fixed by the barrier 80, and outer ends opposite thereto may be fixed by the plate bracket 24 provided at the top plate 20.

Figure 7:
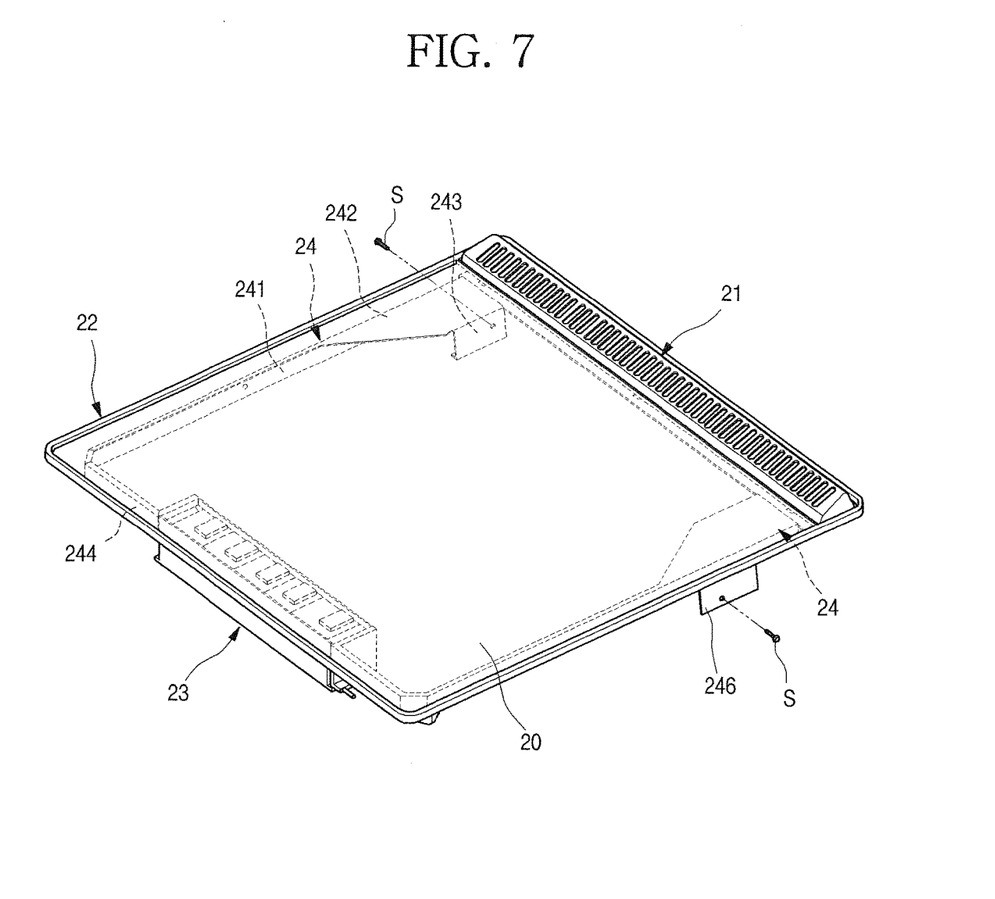
FIG. 7 is a perspective view illustrating a state where an example plate bracket is installed at the top plate.
Figure 8:
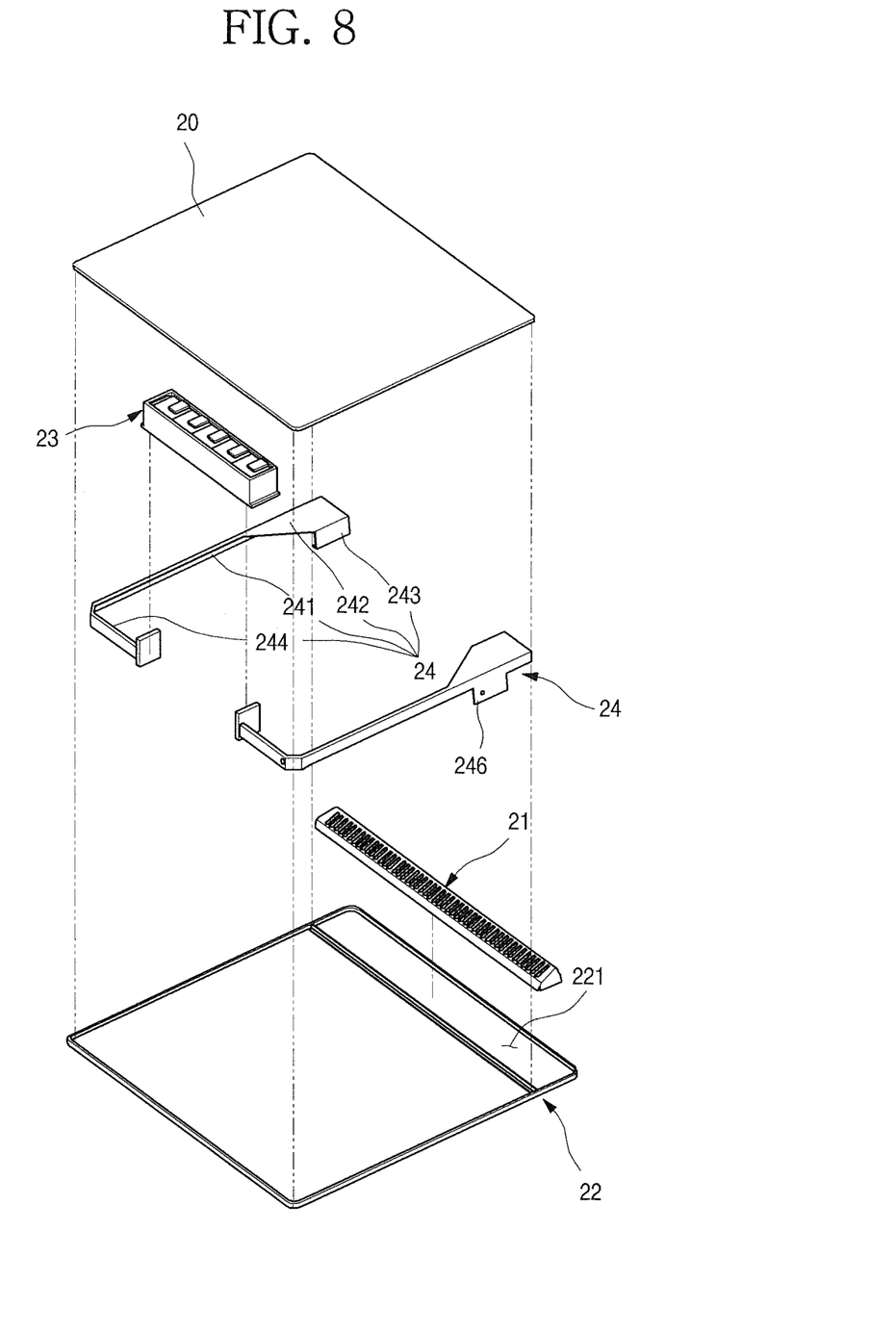
FIG. 8 is an exploded perspective view illustrating an example coupling structure between the top plate and the plate bracket of the combination type cooker.

As illustrated in FIG. 7 and FIG. 8, the top plate 20 is seated on the top frame 22, and forms a surface on which food is seated, and the grille vent 21 is provided at a rear of the top plate 20, and the plate bracket 24 may be provided at the top plate 20. The plate bracket 24 is provided at the lower surface of the top plate 20, and one pair of plate brackets 24 may be provided at both of left and right sides facing each other. When the top frame 22 on which the top plate 20 is seated is seated on the case 10, the plate bracket 24 is located inside the case 10.

Specifically, the plate bracket 24 may include the extending portion 241 which extends along the lower surface of the top plate 20, the top plate fixing portion 242 which is formed at an upper end of the extending portion 241 to be fixed to the top plate 20, and the operation unit fixing portion 244 which is bent inward from a front end of the extending portion 241 to fix both ends of the operation unit 23 provided inside the case 10.

The extending portion 241 extends along each of both side ends of the top plate 20 in forward and backward directions, and the top plate fixing portion 242 is formed to extend inward from a rear end of the extending portion 241. The top plate fixing portion 242 is formed to have a predetermined area, and provides a stable coupling force to the top plate 20. That is, an upper end of the plate bracket 24 including the top plate fixing portion 242 may be bonded or attached to the lower surface of the top plate 20, and thus may be fixed thereto.

The bracket fixing portion 243 which is bent downward is formed at the top plate fixing portion 242. Each of both of the bracket fixing portions 243 and 246 is formed to extend to one side of each of the insulator case 31 and the induction case 72, and may be fixed by the fastening member such as the screw passing through and fastened to the insulator case 31 and the induction case 72. Therefore, the insulator case 31 and the induction case 72 have a structure which is fixed to the plate bracket 24.

Due to such a structure, both ends of the gas burner 40 and the induction burner 70 may be fixed to the barrier 80 and the plate bracket 24, respectively. Since the barrier 80 and the plate bracket 24 are attached to the top plate 20, the gas burner 40 and the induction burner 70 may be attached to the top plate 20 in a module type.

The operation unit fixing portion 244 may be extend inward from an end of the extending portion 241, and may be fixed to each of both of side surfaces of the operation unit 23. Accordingly, the operation unit 23 may also be coupled to the top plate 20 in a module state. The fixing portion 245 which extends perpendicularly to the operation unit fixing portion 244 and is in contact with the operation unit 23 to further stably fix the operation unit 23 may be further formed at an end of the operation unit fixing portion 244.

Figure 9:
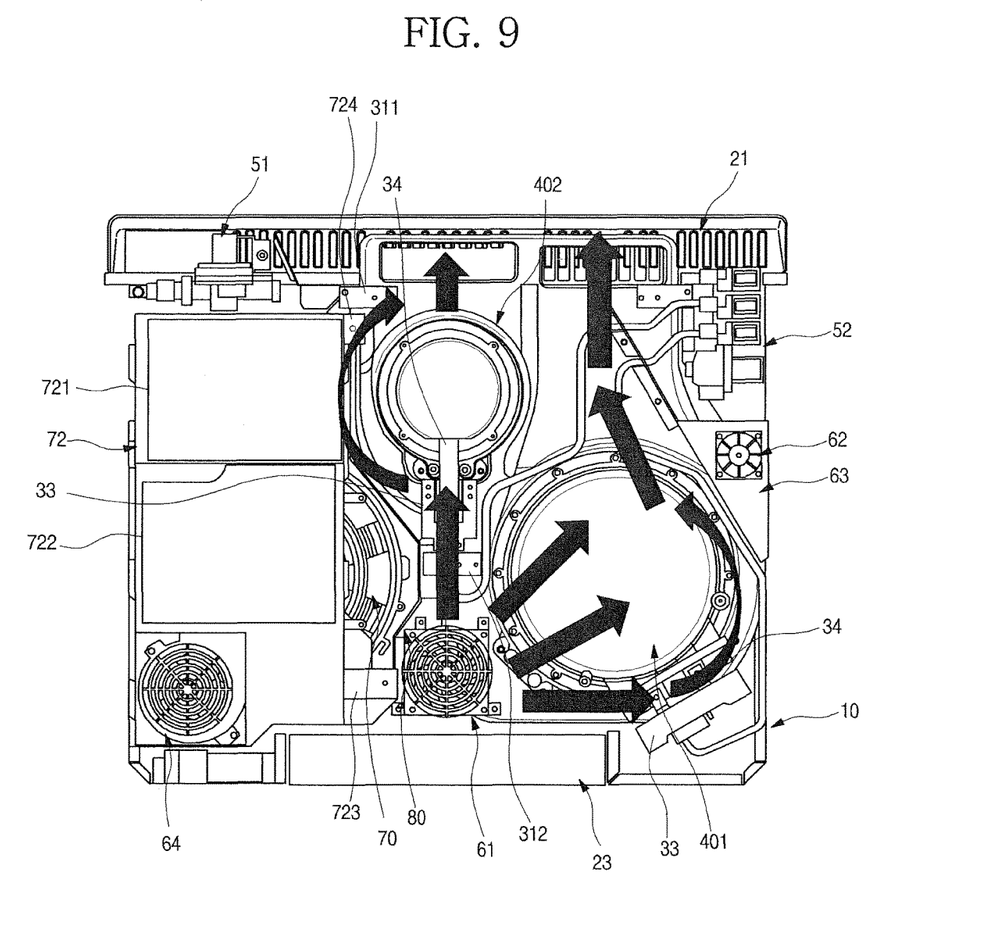
FIG. 9 is a view illustrating a flowing state of cooling air when a gas burner of the combination type cooker is operated.

As illustrated in FIG. 9, when a user operates the operation unit 23, and inputs an operation of the gas burner 40, opening and closing of the valve unit 52 is determined according to an operating signal, and thus the gas may be supplied to the desired gas burner 40.

When the gas is mixed with the air, and then the mixed gas is supplied to the gas burner 40, the mixed gas is ignited by the spark plug 32, and the combustion occurs at the red-heat plate 42, and thus the red-heat plate 42 may be heated. By heating of the red-heat plate 42, a radiant wave may be emitted from the red-heat plate 42 to an outside, and thus may heat food or a container including the food which is seated on the top plate 20.

The user may control heating power of the gas burner 40 through an operation of the operation part 201, and may also visually check an ignition state of the gas burner 40 and a heating state through the top plate 20 because visible rays are included in the radiant wave.

The main fan 61 and the sub-fan 62 are driven along with the ignition of the gas burner 40. By the driving of the main fan 61, the air in the case 10 may be suctioned toward the main fan 61. The suctioned air is discharged radially centering on the main fan 61.

Some of the air blown through the main fan 61 flows toward the PCB 231 of the operation unit 23, and thus the PCB 231 is continuously cooled to be normally operated, and also a front half portion of the top plate 20, particularly, the operation part 201 may be cooled.

Some of the air blown through the main fan 61 may pass between the first burner 401 and the second burner 402, may flow to a rear side, and then may be discharged through the grille vent 21.

As described above, by rotation of the main fan 61, the air in the case 10 continuously cools the front half portion of the top plate 20 at which the operation unit 23 is located, and the air close to the first burner 401 and the second burner 402 is discharged, and thus an internal temperature of the case 10 is prevented from being increased to a preset temperature or more.

When the sub-fan 62 is driven, the air outside the case 10 may be introduced into the case 10, and may independently cool the internal space of the case 10 partitioned by the side barrier 63. That is, due to the driving of the sub-fan 62, the valve unit 52 may be cooled independently.

The heat generated upon the combustion of the gas burner 40 may be effectively cooled by the main fan 61, and then may be discharged through the grille vent 21. Also, the heat may be prevented from being introduced toward the induction burner 70 partitioned by the barrier 80.

Figure 10:
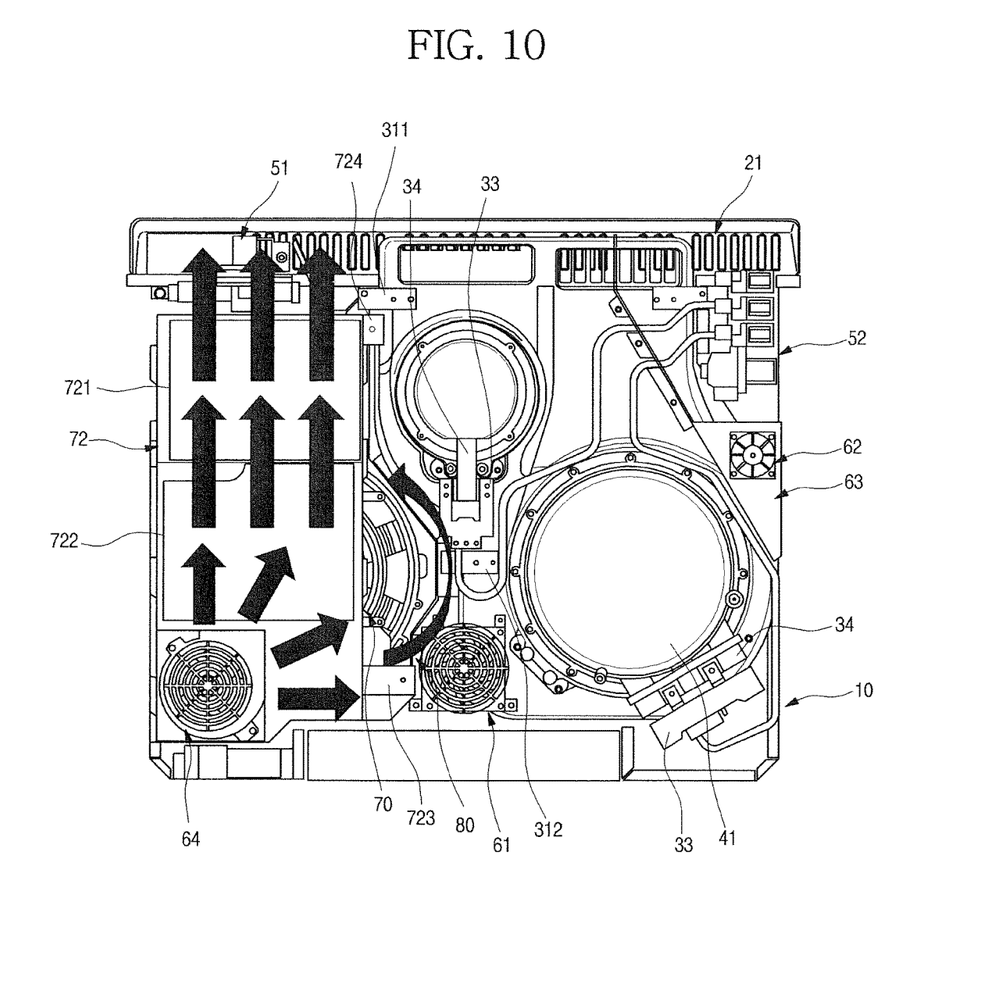
FIG. 10 is a view illustrating the flowing state of the cooling air when an induction burner of the combination type cooker is operated.

As illustrated in the FIG. 10, when the user operates the operation unit 23, and inputs an operation of the induction burner 70, the control part 721 and the inverter module 722 are driven according to an operating signal, and the alternate magnetic field is formed at the induction heating part 71, and the container including the food which is seated on the top plate 20 may be induction-heated.

Meanwhile, at the same time when the induction burner 70 is operated, the induction fan 64 is operated, and the induction fan 64 blows the cooling air from a front of the induction case 72 toward a rear of the induction case 72.

The air blown toward the rear effectively cools the inverter module 722 generating heat, while passing through the induction case 72, and also cools other elements including the control part 721. In addition, some of the air blown by the induction fan 64 discharges the air in the internal space of the case 10, in which the induction burner 70 is accommodated, to the outside through the grille vent 21.

As described above, when the gas burner 40 and the induction burner 70 which are provided at both of the spaces partitioned by the barrier 80 are operated, cooling structures may be formed independently, and the cooling air in each of the spaces may not be introduced into the adjacent space by the barrier 80, but may be discharged, and thus the stable operation of the induction burner 70 may be ensured.

In some implementations, the combination type cooker may not be installed at the furniture such as the sink in a built-in method, but may be independently installed at a separate case.

Figure 11:
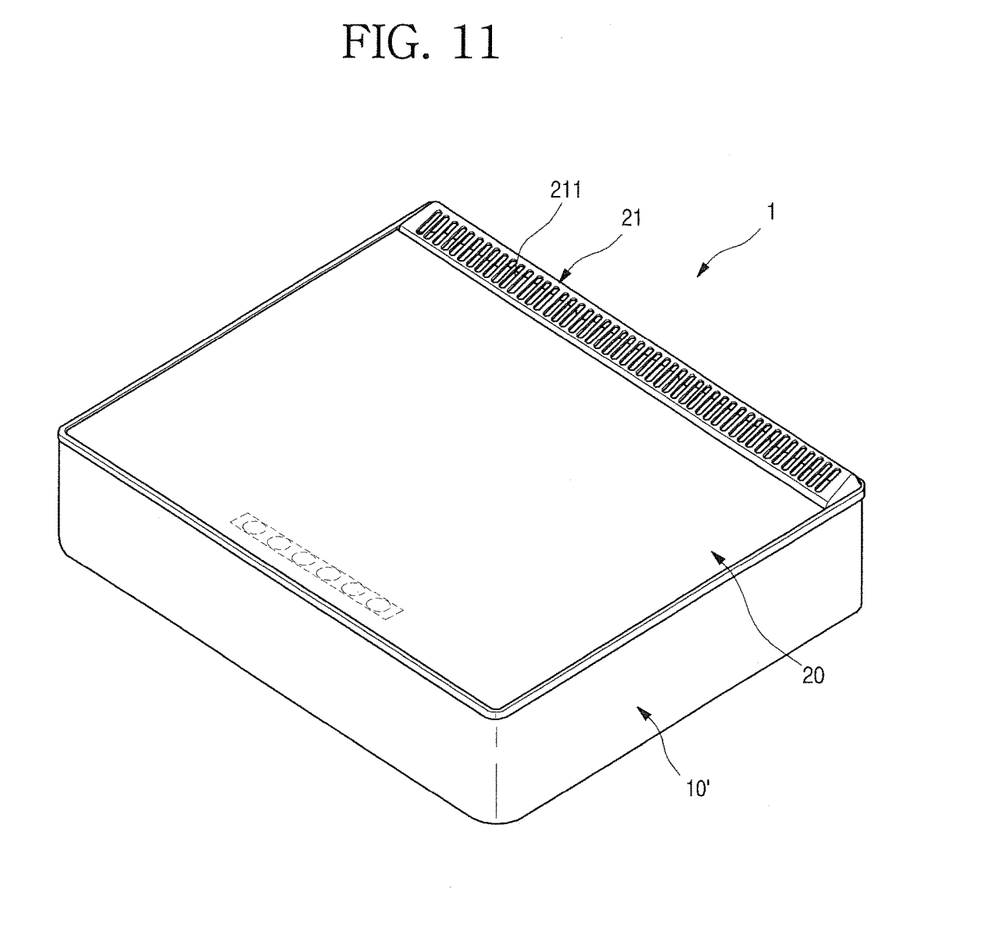
FIG. 11 is a perspective view of an example of a combination type cooker.

As illustrated in FIG. 11, a combination type cooker 1 may be formed to be seated on an outer case 10' which forms an exterior while the top plate 20 and the case 10 are assembled.

In some implementations, the top plate 20 may be directly installed at the outer case 10', and all of the elements including the burner unit 30 which are disposed in the case 10 may be installed inside the outer case 10'.

Although implementations have been described with reference to a number of illustrative implementations, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A combination type cooker comprising:
a top plate having a surface on which food is seated;
a case configured to form a space shielded by the top plate;
a gas burner provided inside the case, and in which a red-heat plate is heated by combustion of a fuel gas;
an insulator case that is configured to accommodate the gas burner;
an induction burner provided inside the case, and configured to heat a cooking container in an induction heating method;
an induction case in which the induction burner is seated; and
a barrier provided between the gas burner and the induction burner, and configured to partition an inside of the case into a space in which the gas burner is provided and a space in which the induction burner is provided,
wherein the barrier comprises:
a partitioning portion that is configured to extend from a front end of the case to a rear end of the partitioning portion;
a plate supporting portion that is bent from one end of the partitioning portion, and that is configured to support a lower surface of the top plate; and
a burner fixing portion that is bent from the other end of the partitioning portion, and that is coupled to the insulator case and the induction case, and fixes the gas burner and the induction burner.

2. The cooker according to claim 1, wherein the partitioning portion is formed to be bent several times and thus to pass the gas burner and the induction burner.

3. The cooker according to claim 1, wherein coupling portions which connect the insulator case and the induction case with the burner fixing portion are provided at the insulator case and the induction case.

4. The cooker according to claim 1, wherein one pair of plate brackets are installed at both of left and right sides of a lower surface of the top plate, and the pair of plate brackets fix each of the insulator case and the induction case.

5. The cooker according to claim 4, wherein the plate bracket comprises an extending portion which extends along the lower surface of the top plate; a top plate fixing portion which is formed at an upper end of the extending portion, and fixed to the top plate; and
an operation unit fixing portion which is bent inward from a front end of the extending portion, and fixes both ends of an operation unit provided inside the case, and a bracket fixing portion which extends downward, and fixes outer ends of the insulator case and the induction case is formed at the top plate fixing portion.

6. The cooker according to claim 5, wherein the operation unit is in contact with the lower surface of the top plate, and recognizes a user's touching operation.

7. The cooker according to claim 5, wherein a main fan which suctions air outside the case, and cools a gas burner accommodating space partitioned by the barrier is provided at a space formed among the operation unit, the gas burner and the barrier.

8. The cooker according to claim 7, wherein an induction fan which suctions the air outside the case, and cools an induction burner accommodating space partitioned by the barrier is provided at a space in which the induction burner is provided.

9. The cooker according to claim 8, wherein a plurality of switching elements are provided inside the induction case, and the induction fan is located at opened one side of the induction case, and enables cooling air to pass through the induction case.

10. The cooker according to claim 9, wherein the induction case is provided between the induction fan and a grille vent formed at a rear of the top plate.

11. The cooker according to claim 5, wherein an electronic valve unit which is operated by an operation of the operation unit, and controls gas supply to the gas burner is provided inside the case.

12. The cooker according to claim 11, wherein a side barrier which connects a rear surface of the case with one side surface, and partitions an inside of the case is provided at the case, and the electronic valve unit is accommodated in an independent space partitioned by the barrier and separated from the gas burner.

13. The cooker according to claim 12, wherein a sub-fan which suctions air outside the case, and cools the electronic valve unit is further provided at a space in which the electronic valve unit is accommodated.

14. The cooker according to claim 1, wherein the barrier is formed to cross an exhaust portion through which air in the case is discharged.

15. The cooker according to claim 1, wherein a plurality of burners are accommodated in the insulator case.

16. The cooker according to claim 1, wherein the case is buried and installed at furniture in a built-in method.

17. The cooker according to claim 1, wherein the combination type cooker is disposed above an oven of a gas oven range.

18. The cooker according to claim 1, wherein the case is an outer case which forms an exterior exposed to an outside when the combination type cooker is installed.

* * * * *